US012245033B2

(12) United States Patent
Dudar (10) Patent No.: US 12,245,033 B2
(45) Date of Patent: Mar. 4, 2025

(54) NETWORK-ASSISTED ATTACHMENT FOR HYBRID SUBSCRIBERS (71) Applicant: Verizon Patent and Licensing Inc., Basking Ridge, NJ (US)

(72) Inventor: Zoltan Janos Dudar, Roswell, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 17/561,274

(22) Filed: Dec. 23, 2021

(65) Prior Publication Data
US 2023/0209343 A1 Jun. 29, 2023

(51) Int. Cl.
H04L 29/06 (2006.01)
H04W 8/04 (2009.01)
H04W 8/20 (2009.01)
H04W 12/03 (2021.01)
H04W 12/06 (2021.01)

(52) U.S. Cl.
CPC .......... *H04W 12/068* (2021.01); *H04W 8/04* (2013.01); *H04W 8/20* (2013.01); *H04W 12/03* (2021.01)

(58) Field of Classification Search
CPC ..... H04W 12/068; H04W 12/03; H04W 8/04; H04W 8/20; H04L 63/083; H04L 63/0853; H04L 63/0884; H04L 63/0876
See application file for complete search history.

(56) References Cited

U.S. PATENT DOCUMENTS

2016/0261596 A1\* 9/2016 Khello .................. H04W 12/08
2022/0060897 A1\* 2/2022 Bartolomé Rodrigo ..................... H04W 12/06
2022/0159460 A1\* 5/2022 Ben Henda ......... H04W 12/041
2022/0386099 A1\* 12/2022 Krishnasami ........... H04W 8/04

\* cited by examiner

*Primary Examiner* — Joseph P Hirl
*Assistant Examiner* — Chi D Nguy

(57) ABSTRACT

A first network component in a first wireless network may be configured to: receive a first request from a core network component in the first wireless network, to authenticate a User Equipment device (UE); and attempt to authenticate the UE. When the attempt to authenticate the UE is successful, the first component may send a first reply to the core network component. The first reply may indicate that the UE is successfully authenticated. When the attempt to authenticate the UE is not successful, the first component may send a second request to authenticate the UE to a second network component in a second wireless network; and receive a response to the second request from the second network component. The response may indicate whether the UE is successfully authenticated at the second network component.

20 Claims, 10 Drawing Sheets

NETWORK-ASSISTED ATTACHMENT FOR HYBRID SUBSCRIBERS

BACKGROUND INFORMATION

Modern smart phones may be capable of accessing more than one wireless network (e.g., a cellular network). Each wireless network may be a public land mobile network (PLMN) or a private mobile network. For a smart phone to access a wireless network of either type, the smart phone may need to access subscriber credentials, for the wireless network, which are stored within a type of component typically referred to as a Subscriber Identity Module (SIM).

DETAILED DESCRIPTION OF EXAMPLE EMBODIMENTS

The following detailed description refers to the accompanying drawings. The same reference numbers in different drawings may identify the same or similar elements. As used herein, the term Subscriber Identity Module (SIM) may not only refer to a SIM, but also variants of SIM or SIM-like components, such as for example, an embedded SIM (eSIM), a Universal Integrated Circuit Card (UICC), or embedded UICC (eUICC).

The systems and methods described herein relate to allowing a user of a mobile device, which has only a single Subscriber Identity Module (SIM) for the mobile device, to access multiple wireless networks using a single set of user credentials stored within the SIM. As For example, assume that each of subscribers of a first wireless network has a mobile device (e.g., a smart phone) with a single SIM. One set of subscriber credentials (also referred to as subscription credentials) are stored in the SIM. The systems and methods allow each of the subscribers to use only the subscriber credentials for the first wireless network to attach not only to the first wireless network and access another wireless network through the first wireless network, but to also attach directly to the other wireless network with assistance from the first wireless network. This may be useful when the first wireless network and the second wireless network have a business relationship (e.g., the first wireless network and the other wireless network are operated by the same service provider; the first wireless network manages the other wireless network; etc.), such that it may be desirable to have subscribers of the first wireless network easily access the other wireless network.

For example, assume that a provider of wireless network services (e.g., communication services) operates a Public Land Mobile Network (PLMN) and a private wireless network. In addition, assume that the service provider manages the private wireless network for a subset of the PLMN subscribers. Furthermore, assume that the subset of subscribers use mobile devices that have only a single SIM, which stores subscriber credentials for accessing the PLMN. The systems and methods described herein permit the subset of subscribers (herein referred to as hybrid subscribers) to attach directly to the PLMN and to access, through the PLMN, the private wireless network; and/or attach directly, with assistance from the PLMN, to the private wireless network to access its services (e.g., an application in the private wireless network) while enjoying low latency.

Without the systems and methods described herein, the subscribers may use the PLMN credentials to directly attach only to the PLMN. In this scenario, if a subscriber wants to access the private wireless network, the subscriber may need to access the private wireless network through the PLMN. However, such access to the private wireless network may not be desirable, as the data path from the mobile device to the private wireless network through the PLMN can introduce significant latency when the subscriber accesses the services rendered at the private wireless network. To access the private wireless network directly without the systems and methods described herein, the SIM of the mobile device (which has only a single SIM) may need to store the credentials specifically for the private wireless network instead of the PLMN credentials. This would disable the subscriber from accessing the PLMN. Furthermore, although a mobile device with two SIMS can store separate subscriber credentials for the PLMN and the private wireless network based on the dual SIM technology, the subscribers may not wish to bear the cost of using such a device.

Figure 1A:
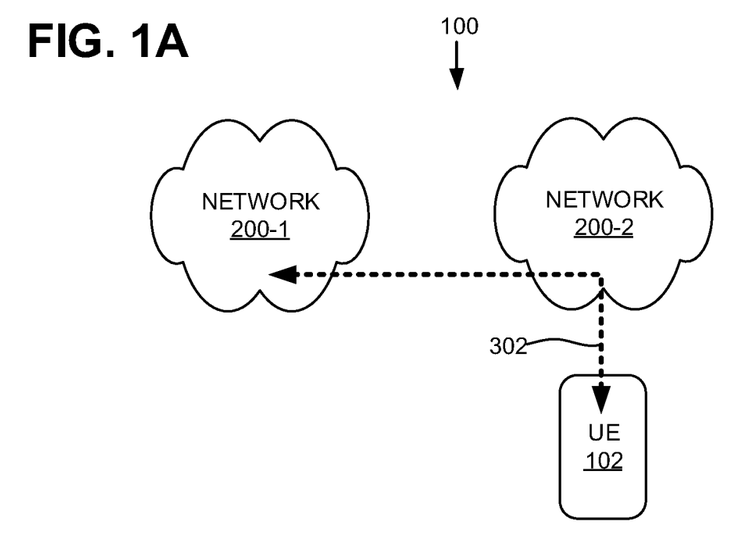
FIGS. 1A and 1B illustrate concepts described herein.
Figure 1B:
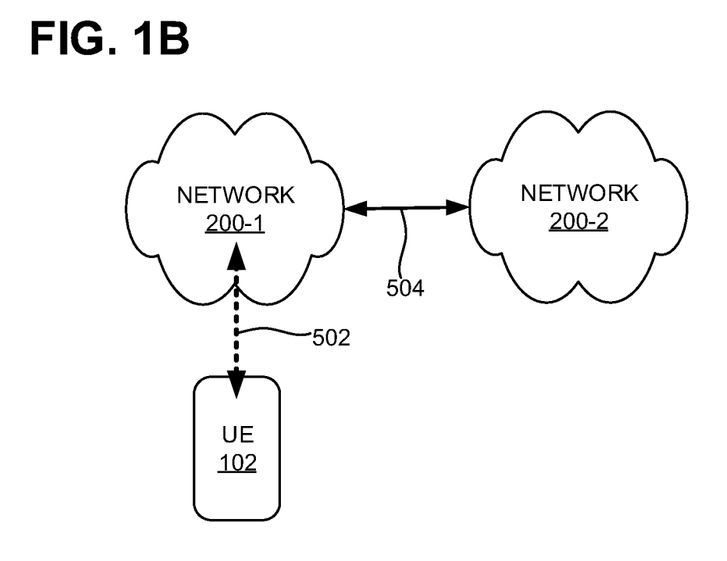

FIGS. 1A and 1B illustrate different ways in which the systems and methods described herein permit a user equipment device (UE) 102 (e.g., a mobile device such as a smart phone) to access a wireless network 200-1 and a wireless network 200-2. Although only two wireless networks are shown in FIGS. 1A and 1B, in practice, UE 102 may access more than two wireless networks. For FIGS. 1A and 1B, assume that UE 102 includes a single SIM that stores a set of subscriber credentials for attaching to wireless network 200-2. Wireless networks 200-1 and 200-2 may have a business relationship such that it is desirable to have subscribers of wireless network 200-2 the ability to access wireless network 200-1.

In FIG. 1A, UE 102 may attach to wireless network 200-2 (e.g., a PLMN) using the set of subscriber credentials associated with network 200-2 and establish a signal and/or data path. After UE 102 attaches to wireless network 200-2, UE 102 may access another wireless network, such as wireless network 200-1 (e.g., a private wireless network), through wireless network 200-2. That is, UE 102 may establish a data path 302 to network 200-1 through network 200-2. Data path 302 can be circuitous, because path 302 not only traverses various elements of wireless network 200-1 and wireless network 200-2 (e.g., a wireless station, gateways, routers, switches, etc.) but other networks and network elements outside networks 200-1 and 200-2. Accordingly, when UE 102 accesses network 200-1 through network 200-2 over data path 302, UE 102 may experience significant latency.

In FIG. 1B, UE 102 may attach directly to wireless network 200-1 using the subscriber credentials for wireless network 200-2. When UE 102 attempts to attach to wireless network 200-1, wireless network 200-1 recognizes that UE 102 is not one of its subscriber devices. However, wireless network 200-1 may still permit UE 102 to attach to wireless network 200-1 provided that UE 102 is subscribed to wireless network 200-2. This may be desirable, as explained above, when the operator of a wireless network (e.g., wireless network 200-2) manages one or more other wireless networks (e.g., wireless network 200-1) and endows its subscribers with the ability to easily access multiple wireless networks.

Accordingly, wireless network 200-1 (or one of its components) reaches out to wireless network 200-2 (or a component within wireless network 200-2) and requests wireless network 200-2 to authenticate UE 102 over its connection 504 to wireless network 200-2. Because UE 102 is a subscriber of network 200-2, network 200-2 is able to verify or validate the identity of UE 102 and authenticate UE 102. After the authentication, wireless network 200-1 and UE 102 establish a data path 502, over which UE 102 may access wireless network 200-1 for its services.

In FIGS. 1A and 1B, although paths 302 and 502 both permit UE 102 to access wireless network 200-1, path 502 is direct (it does not pass through wireless network 200-2) and thus has lower latency. Hence, for UE 102, data path 502 is preferable over data path 302 for low latency services. If UE 102 is physically at a location where wireless network 200-1 does not have coverage/presence and network 200-2 does, UE 102 may nonetheless access wireless network 200-1 through wireless network 200-2 over data path 302.

Figure 2A:
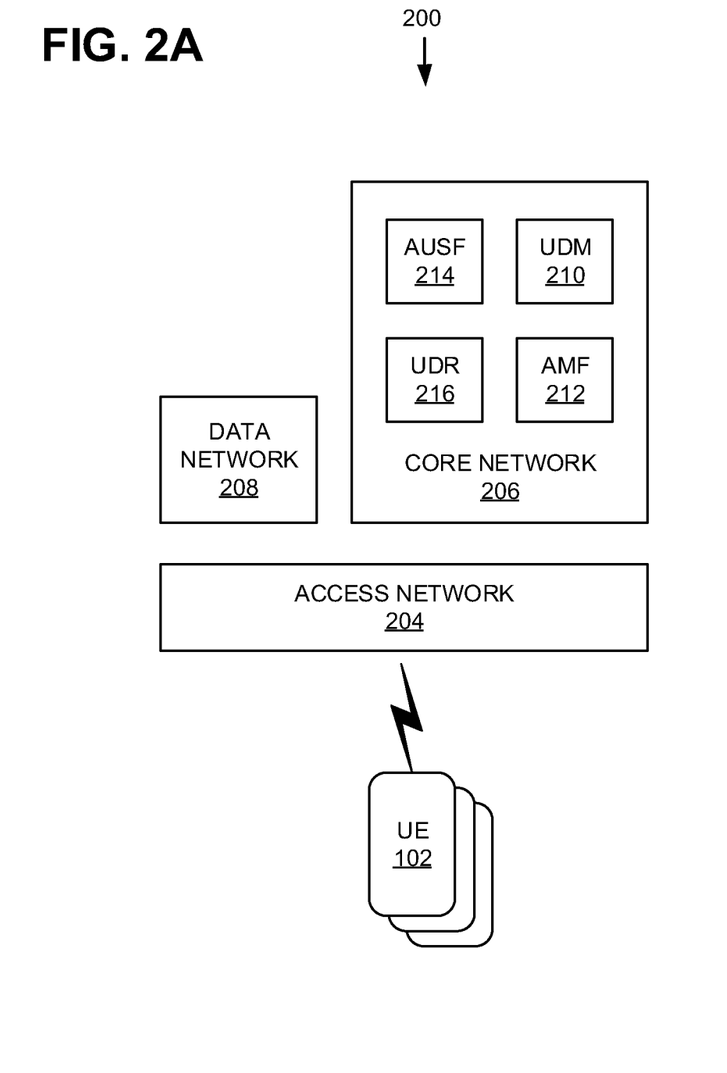
FIG. 2A illustrates an example network in which the systems and methods described herein may be implemented.

FIG. 2A illustrates an example network 200 according to an implementation. Network 200 may be configured and implemented as wireless network 200-1, wireless network 200-2, or another wireless network (e.g., a private wireless network). As shown, network 200 may include UEs 102 (individually and generically referred to as UE 102 and collectively as UEs 102), an access network 204, a core network 206, and a data network 208. UE 102 may include, for example, a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device.

In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204. UE 102 may have the capability to select a particular network slice from which UE 102 can request a service. UE 102 may have the capability to connect to different Radio Access Technology (RAT) access devices, such as Long-Term Evolution (LTE) or 5G base stations.

As discussed above, UE 102 may include at least one Subscriber Identity Module (SIM). A SIM may include, for example, an embedded SIM (eSIM), a Universal Integrated Circuit Card (UICC), or embedded UICC (eUICC). The SIM may store a user (or a subscriber) credentials associated with accessing network 200. Furthermore, to enable UE 102 to access multiple networks, such as in the scenarios depicted in FIGS. 1A and 1B, the SIM may also include additional information, such as access point names (APNs), network addresses, etc., for accessing particular services.

Access network 204 may allow UE 102 to access core network 206. To do so, access network 204 may establish and maintain, with participation from UE 102, an over-the-air channel with UE 102; and maintain backhaul channels (not shown) with core network 206. Access network 204 may convey information through these channels, from UE 102 to core network 206 and vice versa.

Access network 204 may include an LTE radio network, a Next Generation (NG) radio access network (e.g., Fifth Generation (5G) radio access network) and/or another advanced radio network. These radio networks may operate in many different frequency ranges, including millimeter wave (mmWave) frequencies, sub 6 GHz frequencies, and/or other frequencies. Access network 204 may include many wireless stations, Central Units (CUs), Distributed Units (DUs), Radio Units (RUs), and Integrated Access and Backhaul (IAB) nodes. The wireless station, CUs, DUs, RUs, and/or IAB nodes may establish and maintain over-the-air channels with UEs 102 and backhaul channels with core network 206.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a PLMN, or a combination of networks. Core network 206 may allow the delivery of Internet Protocol (IP) services to UE 102 and may interface with other networks, such as data network 208.

Depending on the implementation, core network 206 may include 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.) and/or 5G core network components. As shown, the 5G core network components may include a Unified Data Management (UDM) 210, an Access and Mobility Management Function (AMF) 212, an Authentication Server Function (AUSF) 214, and a Unified Data Repository (UDR) 216. Although core network 206 may include other 5G core network components (or other 4G core network components), they are not shown in FIG. 2A for clarity.

UDM 210 may manage subscription information, handle user identification and authentication (together with AUSF 214) and perform access authorization. AMF 212 may perform registration management, connection management, reachability management, mobility management, and/or lawful intercepts. AUSF 214 may render authentication services and other security related services to other network components, such as UDM 210. UDR 216 may store subscriber information and/or other types of information. In some implementations, UDR 216 may store subscriber credentials and/or UDM credentials, which may be associated with a UDM. The UDM credentials may be used by UDM 210 or AUSF 214 to authenticate the UDM.

Data network 208 may include networks that are external to core network 206. In some implementations, data network 208 may include packet data networks, such as an Internet Protocol (IP) network. In another implementation, data network 208 may be part of core network 206. Data network 208 may provide particular network services, such as, for example, Voice-over-IP (VoIP) services, messaging services, video services, etc.

Figure 2B:
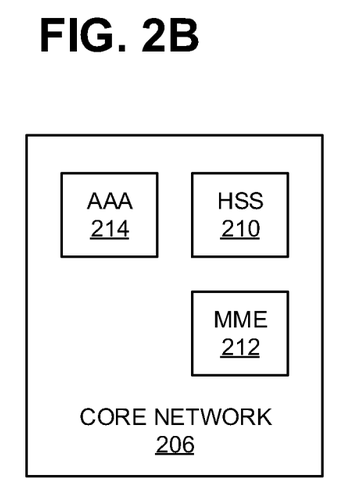
FIG. 2B illustrates an example core network according to an implementation.

For simplicity, FIG. 2A does not show all components that may be included in network 200 (e.g., routers, bridges, wireless access points, additional networks, additional UEs 102, wireless stations, IAB nodes, CUs, DUs, RUs, etc.). These components and the components described above may be connected to one another by either wireless links or physical links. Also, depending on the implementation, network 200 may include additional, fewer, different, or a different arrangement of components than those illustrated in FIG. 2A. For example, in some implementation (such as those shown in FIGS. 3 through 7), core network 206 of FIG. 2A may be substituted with a different type of core network 206, such as an evolved packet core (EPC) network. FIG. 2B illustrates a number of components of core network 206 when core network 206 is implemented as an EPC. As shown in FIG. 2B, core network 206 (or EPC) includes a HSS 210, an MME 212, and an AAA 214 may provide similar functionalities as UDM 210, AMF 212, AUSF 214, and may replace UDM 210, AMF 212, and AUSF 214. In some implementations, an HSS may also provide the functionalities of UDR 216 and may take the place of UDR 216. In implementations where 5G core network is replaced with 4G core network (e.g., an EPC), other networks (e.g., access network 204 or data network 208) may also be modified or configured differently to operate with the EPC.

Figure 5:
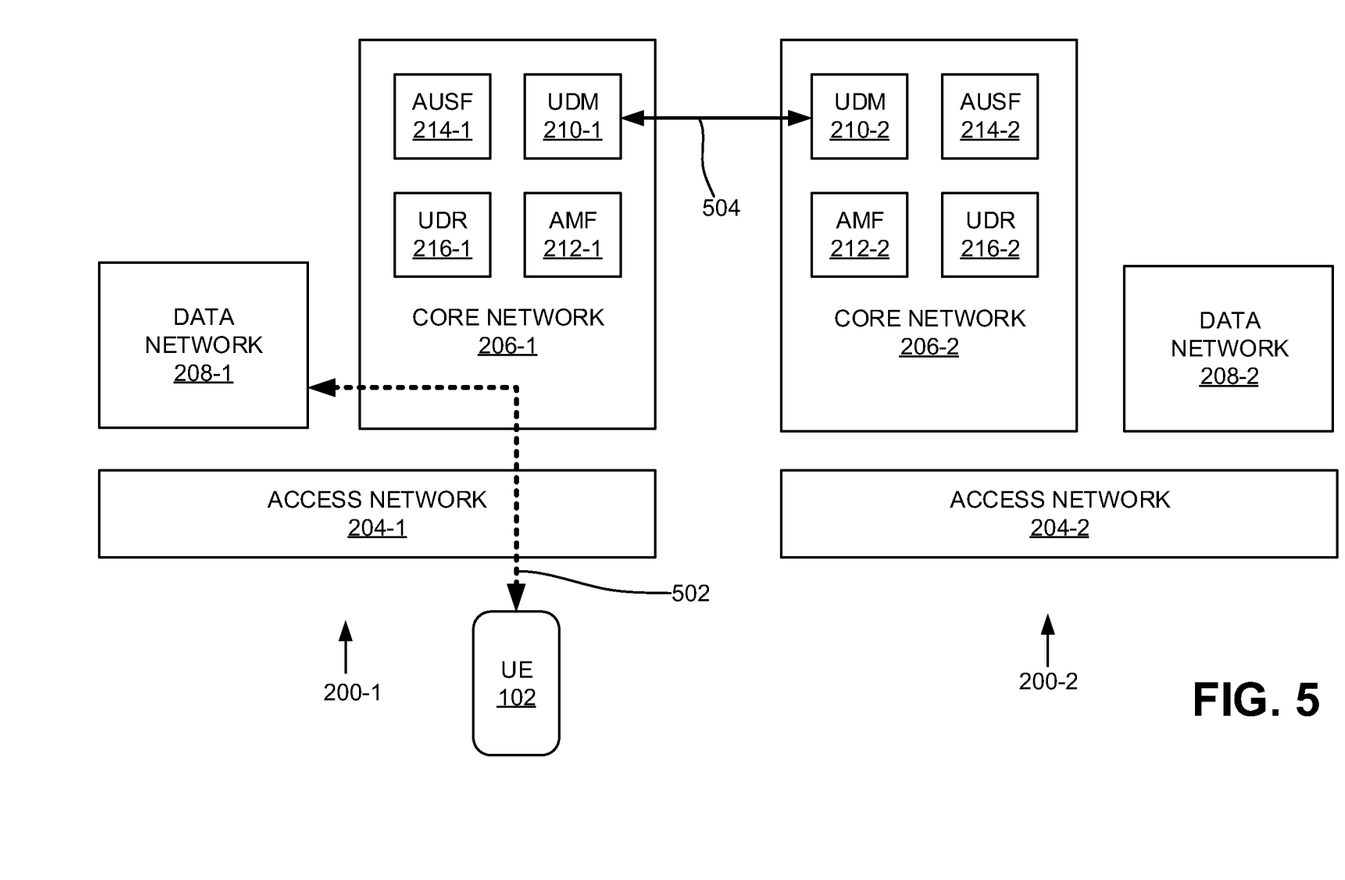
FIG. 5 depicts an exemplary data path for a UE when the UE attaches to a wireless network with assistance from another wireless network, according to an implementation.

As explained above, the systems and methods described herein relate to allowing UE 102, which has only a SIM, to access, in different ways (such as those shown in FIGS. 1A and 1B) multiple wireless networks 200 using a single set of subscriber credentials (stored within the SIM). The system is implemented by adapting or modifying one or more of the core network components (e.g., UDM 210, AMF 212, AUSF 214, UDR 216, and/or corresponding 4G core components such as a HSS, an MME, and an AAA). Given the system, UE 102 may access multiple networks through data paths illustrated in FIGS. 1A and 1B. FIGS. 3 and 5 illustrate these paths 302 and 502 in greater detail.

Figure 3A:
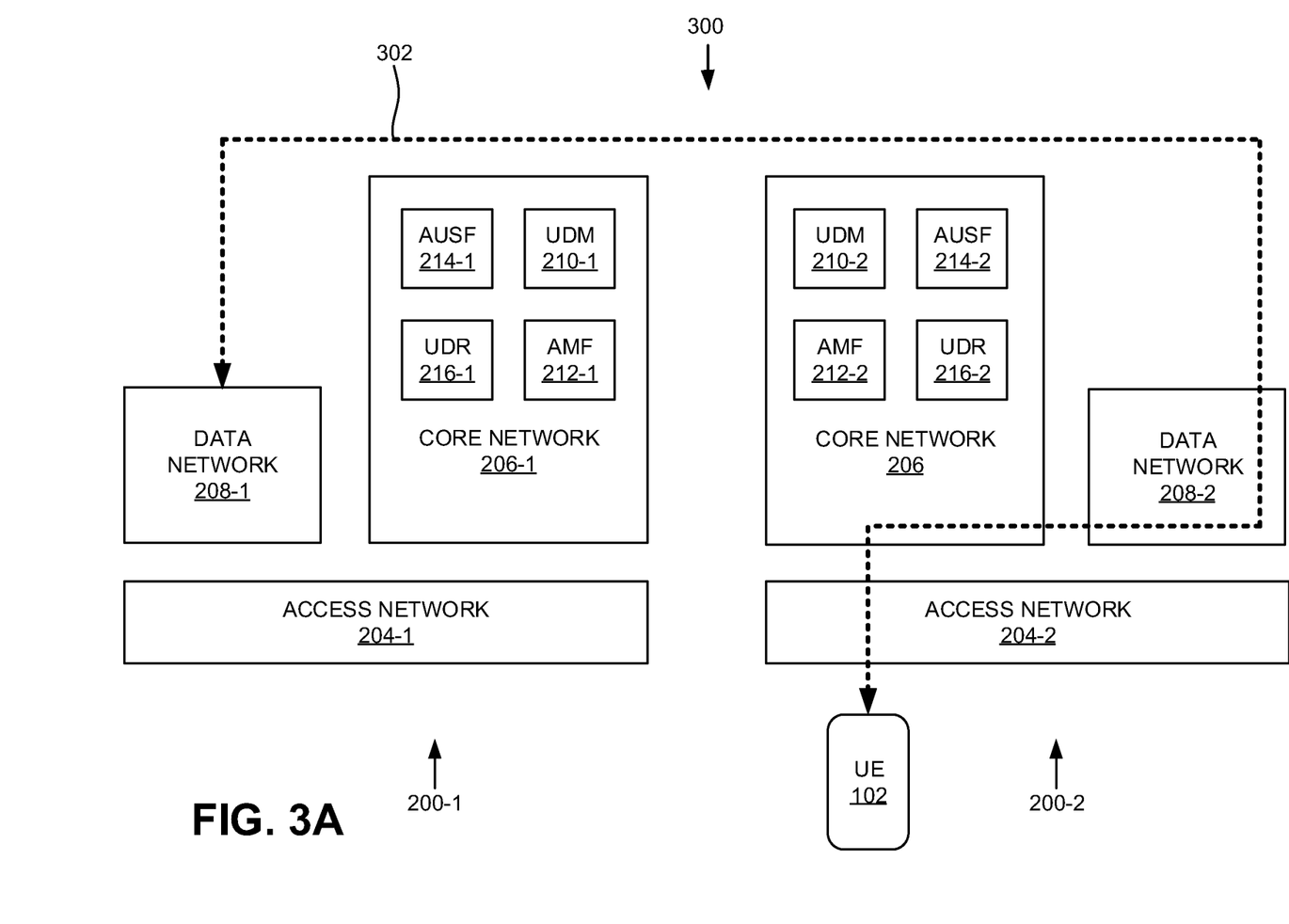
FIG. 3A depicts an example data path for a UE when the UE attaches to a wireless network and accesses, through the wireless network, another wireless network, according to an implementation.

FIG. 3A depicts data path 302 for UE 102 when the UE 102 attaches to wireless network 200-2 and accesses wireless network 200-1 through wireless network 200-2 according to one implementaiton. As shown, network environment 300 includes wireless network 200-1 and wireless network 200-2. Each of the wireless networks 200-1 and 200-2 is similar to wireless network 200. UE 102 is subscribed to network 200-2 but not to wireless network 200-1. In FIG. 3A, after UE 102 attaches to wireless network 200-2, UE 102 establishes a path to data network 208-2 through core network 206-2 and access network 204-2. Once UE 102 reaches data network 208-2, UE 102 may reach wireless network 200-1 and its data network 208-1, through other networks (not shown) to which data networks 208-1 and 208-2 are connected. That is, UE 102 may establish data path 302 through these networks to access data network 208-1.

Figure 3B:
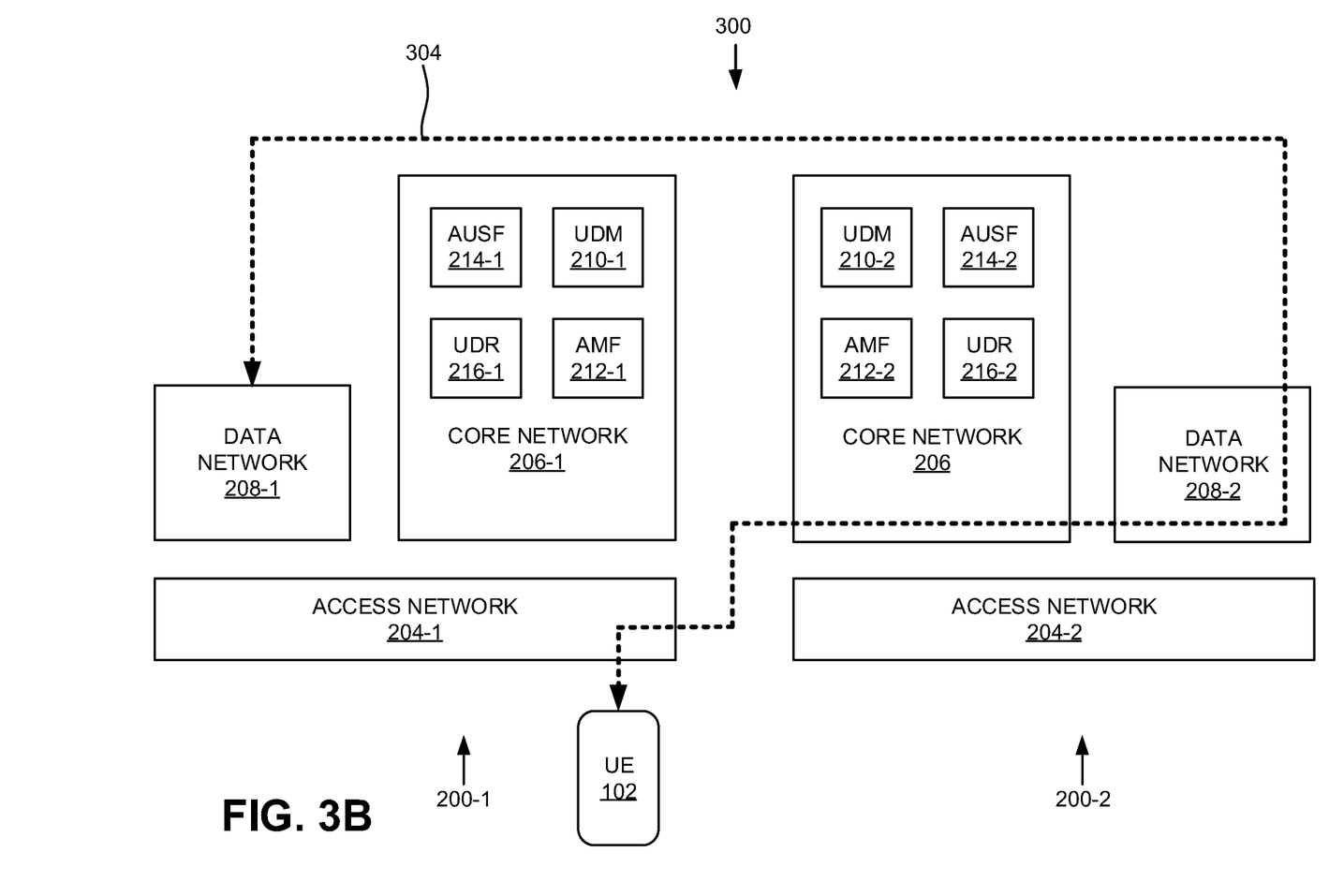
FIG. 3B depicts an example data path for a UE when the UE attaches to a wireless network and accesses, through the wireless network, another wireless network, according to another implementation.

FIG. 3B depicts data path 304 for UE 102 when the UE 102 attaches to wireless network 200-2 and accesses wireless network 200-1 through wireless network 200-2 according to another implementation. The arrangement and configuration of components in FIG. 3B are similar to those of FIG. 3A. In contrast to FIG. 3A, however, in FIG. 3B, wireless networks 200-1 and 200-2 are arranged as Multi-Operator Core Networks (MOCN) that share access networks. As shown, core networks 204-1 and 204-2 share access network 206-1. UE 102 is subscribed to network 200-2 but not to wireless network 200-1. In FIG. 3B, US 102 attaches to core network 206-2 through access network 204-1. After UE 102 attaches to wireless network 200-2, UE 102 establishes a path to data network 208-2 through core network 206-2 and access network 204-1. Once UE 102 reaches data network 208-2, UE 102 may reach wireless network 200-1 and its data network 208-1, through other networks (not shown) to which data networks 208-1 and 208-2 are connected. That is, UE 102 may establish data path 304 through these networks to access data network 208-1.

Figure 4:
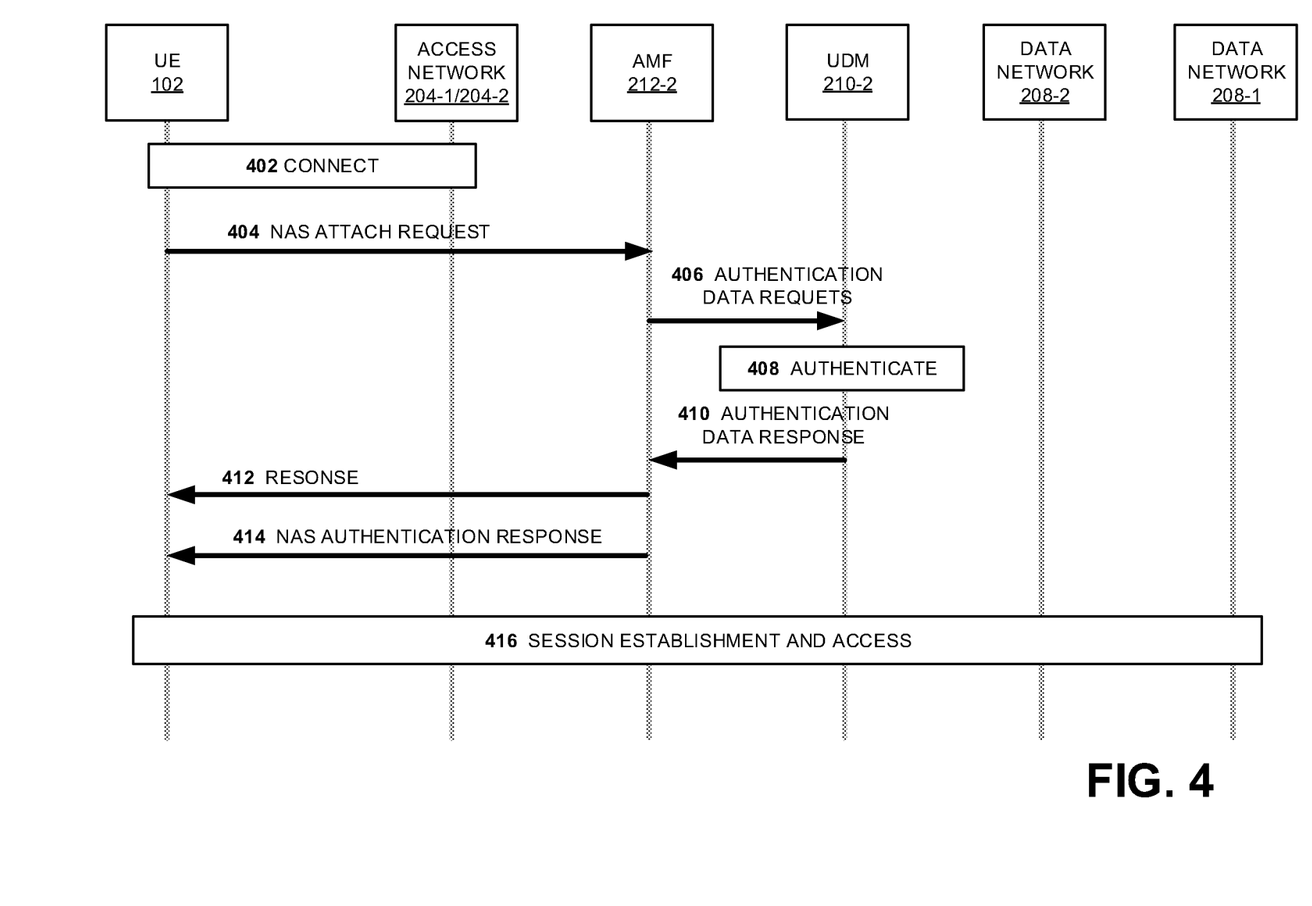
FIG. 4 is a signaling diagram of an example process that is associated with a data path which is established when a UE attaches to a wireless network and accesses, through the wireless network, another wireless network, according to an implementation.

FIG. 4 is a signaling diagram of an example process that is associated with data path 302 or 304, which is established when UE 102 attaches to wireless network 200-2 (through either access network 204-2 in FIG. 3A or 204-1 in FIG. 3B) and accesses, through wireless network 200-2 wireless network 200-1. The process depicted in FIG. 4 contains functions performed by UE 102, access network 204-1/204-2, components of core network 206-2, and data networks 208-2 and 208-1. Each arrow and block in FIG. 4 may represent more than one signal, message, and/or process. Furthermore, FIG. 4 may not show every signal, message, and/or process that is associated with data path 302. For the process, assume that UE 102 is located in a geographical area covered by wireless network 200-2 but not covered by wireless network 200-1.

As shown, the process may begin with UE 102 connecting to access network 204-1/204-2 (block 402). For example, UE 102 may respond to broadcast signals from one of the wireless stations in access network 204-2, proceed through a Random Access Channel (RACH) procedure, and establish a Radio Resource Control (RRC) connection with the wireless station. After establishing the connection, UE 102 may then send a Non-Access Stratum (NAS) attach request (arrow 404). The request may be sent to AMF 212-2 in core network 206-2 over access network 204-2.

In response to the NAS attach request, AMF 212-2 may request UDM 210-2 to authenticate UE 102 (arrow 406). In the request, AMF 212-2 may provide a credentials vector (e.g., a device identifier such as an International Mobile Subscriber Identity (IMSI), etc.) to UDM 210-2. Using the credentials vector, UDM 210-2 may attempt to authenticate UE 102 (block 408). Although not shown, UDM 210-2 may employ other network functions, such as AUSF 214-2 and/or UDR 216-2 to authenticate UE 102.

Assuming the authentication attempt is successful, UDM 210-2 may provide an authentication data response (arrow 410) to AMF 212-2. AMF 212-2 may then forward a response (arrow 412) and a NAS authentication response (arrow 414) to UE 102 over access network 204-1/204-2, allowing UE 102 to complete the NAS attachment. After the NAS attachment, UE 102 may establish a session with data network 208-1 through data network 208-2, over the data path 302 or 304 (block 416). As explained above, path 302 or 304 may introduce some latency, as data path 302 or 304 may traverse multiple networks and network components between data network 208-2 and data network 208-1. However, if UE 102 is in a location where wireless network 200-2 has coverage and wireless network 200-1 does not, UE 102 still may access data network 208-1 through path 302. The latency may be low enough to allow UE 102 to use some applications and/or services at data network 208-1.

FIG. 5 depicts an exemplary data path 502 for UE 102 when UE 102 attaches to wireless network 200-1 with assistance from wireless network 200-2, according to an implementation. Assume that UE 102 is subscribed to wireless network 200-2 but not to wireless network 200-1. In FIG. 5, network 200-1 and network 200-2 are configured so that network 200-1 permits, with assistance from network 200-2, subscribers of network 200-2 to access network 200-1. In particular, when UE 102 attempts to attach to network 200-1, UDM 210-1 initiates authenticating UE 102. However, because UE 102 is not subscribed to network 200-1, UDM 210-1 is unable to verify the validity of the credentials. UDM 210-1 then establishes an authentication session 504 with UDM 210-2 in core network 204-2 of wireless network 200-2, requesting UDM 210-2 to determine whether UE 102 is subscribed to network 200-2 and/or should be allowed to access network 200-1. When UDM 210-2 successfully authenticates UE 102 (since UE 102 is subscribed to network 200-2), UDM 210-1 also validates the identity of UE 102 based on UDM 210-2's authentication result. Once UE 102 is successfully authenticated at UDM 210-1, UE 102 can initiate a session with a network element in data network 208-1 and establish data path 502.

Figure 6:
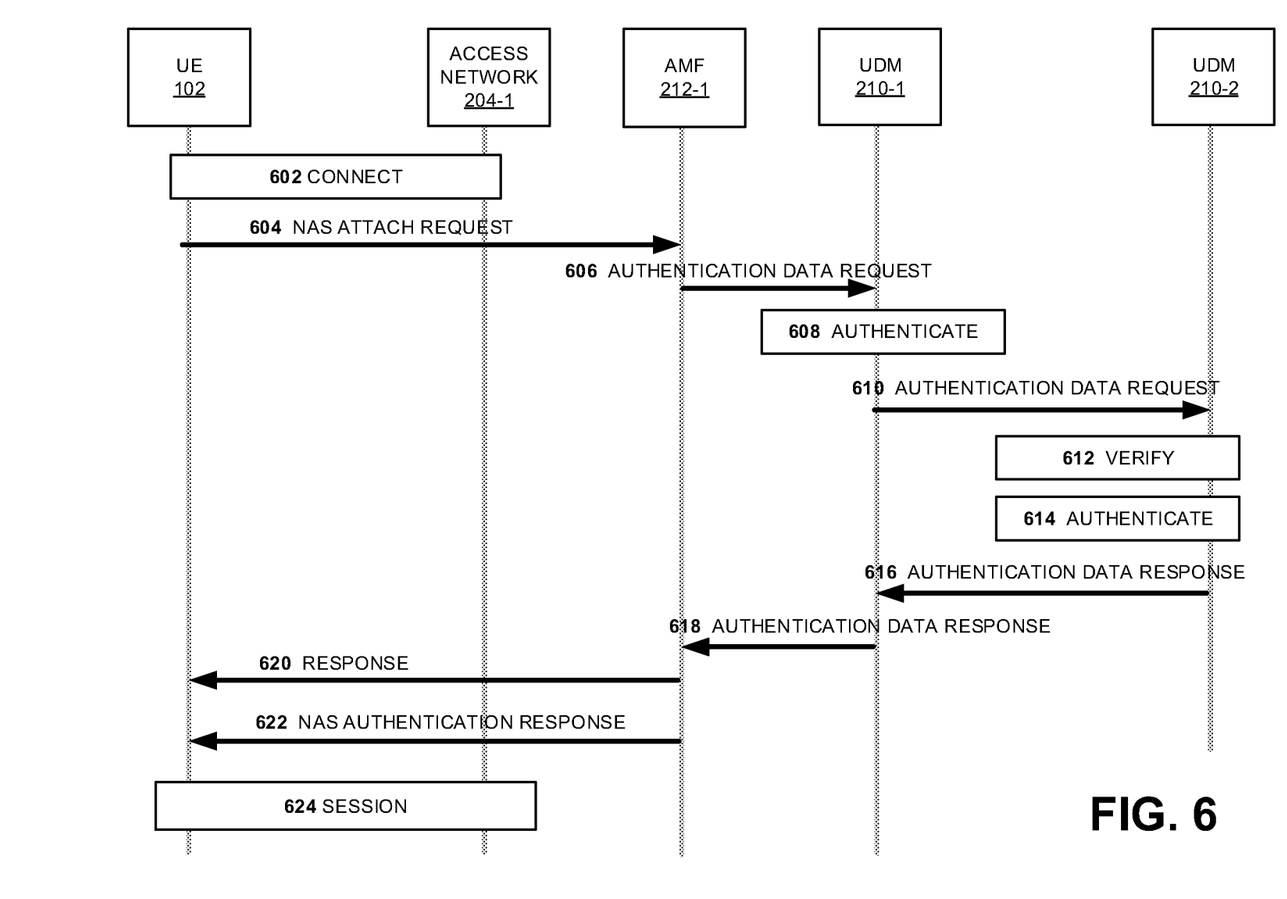
FIG. 6 is a signaling diagram of an example process that is associated with a data path for a UE when the UE attaches to a wireless network with assistance from another wireless network, according to an implementation.

FIG. 6 is a signaling diagram of an example process that is associated with data path 502 which is established when UE 102 attaches to wireless network 200-1 with assistance from wireless network 200-2, according to an implementation. The process of FIG. 6 is performed by UE 102, access network 204-1, components of core networks 206-1 and 206-2, and data network 208-1. Each arrow and block in FIG. 6 may represent more than one signal, message, and/or process. Furthermore, FIG. 6 may not show every signal, message, and/or process that is associated with establishing data path 502. For the process, assume that UE 102 is located in a geographical area covered by network 200-1. Also, assume that UE 102 is subscribed to wireless network 200-2 but not to wireless network 200-1.

As shown, the process may begin with UE 102 connecting to access network 204-1 of wireless network 200-1 (block 602). For example, UE 102 may respond to broadcast signals from one of the wireless stations in access network 204-1, proceed through a RACH procedure, and establish a RRC connection with the wireless station. After establishing the connection, UE 102 may then send a NAS request (arrow 604). The request may be sent to AMF 212-1 in core network 206-1 over access network 204-1.

In response to the NAS attach request, AMF 212-1 may request UDM 210-1 to authenticate UE 102 (arrow 606). In the request, AMF 212-1 may provide a credentials vector (e.g., a device identifier such as an IMSI, etc.) to UDM 210-1. Using the credentials vector, UDM 210-1 may then attempt to authenticate UE 102 (block 608). Although not shown, UDM 210-1 may employ other network function, such as AUSF 214-1 and/or a UDR 216-1 in trying to authenticate UE 102.

Because UE 102 is not subscribed to network 200-1, however, UDM 210-1 is not able to verify the identity of UE 102 and thus is not able to authenticate UE 102. However, since it is possible that UE 102 is subscribed to wireless network 200-2, UDM 210-1 initiates a process to determine whether UE 102 is subscribed to network 200-2. The process includes establishing an authentication session with UDM 210-2 of wireless network 200-2, sending a request for authentication data (arrow 610), receiving data from UDM 210-2, forwarding credentials vectors associated with UDM 210-1 and a UE 102 to UDM 210-2, and receiving a result of authenticating UE 102 at UDM 210-2.

When UDM 210-2 receives the request, UDM 210-2 verifies or validates the identity of UDM 210-1 (block 612), that is, attempts to authenticate UDM 210-1. If UDM 210-2 can successfully verify the identity of UDM 210-1 (i.e., verify that UDM 210-1 has the authority to make the request to UDM 210-2 to authenticate UE 102), UDM 210-2 then authenticates UE 102 (block 614). Assuming that the UE 102 authentication is successful (e.g., verifies that UE 102 is subscribed to network 200-2), UDM 210-2 forwards an authentication data response (arrow 616) to UDM 210-1. Subsequently, UDM 210-1 relays the authentication data response to AMF 212-1 (arrow 618).

When AMF 212-1 receives the authentication data response from UDM 210-1, AMF 212-1 sends a response (arrow 620) to the NAS attach request and a NAS authentication response (arrow 622). Upon receipt of the responses, UE 102 may then initiate a session (through access network 204-1) with data network 208-1 (not shown in FIG. 6), establishing data path 502.

Figure 7:
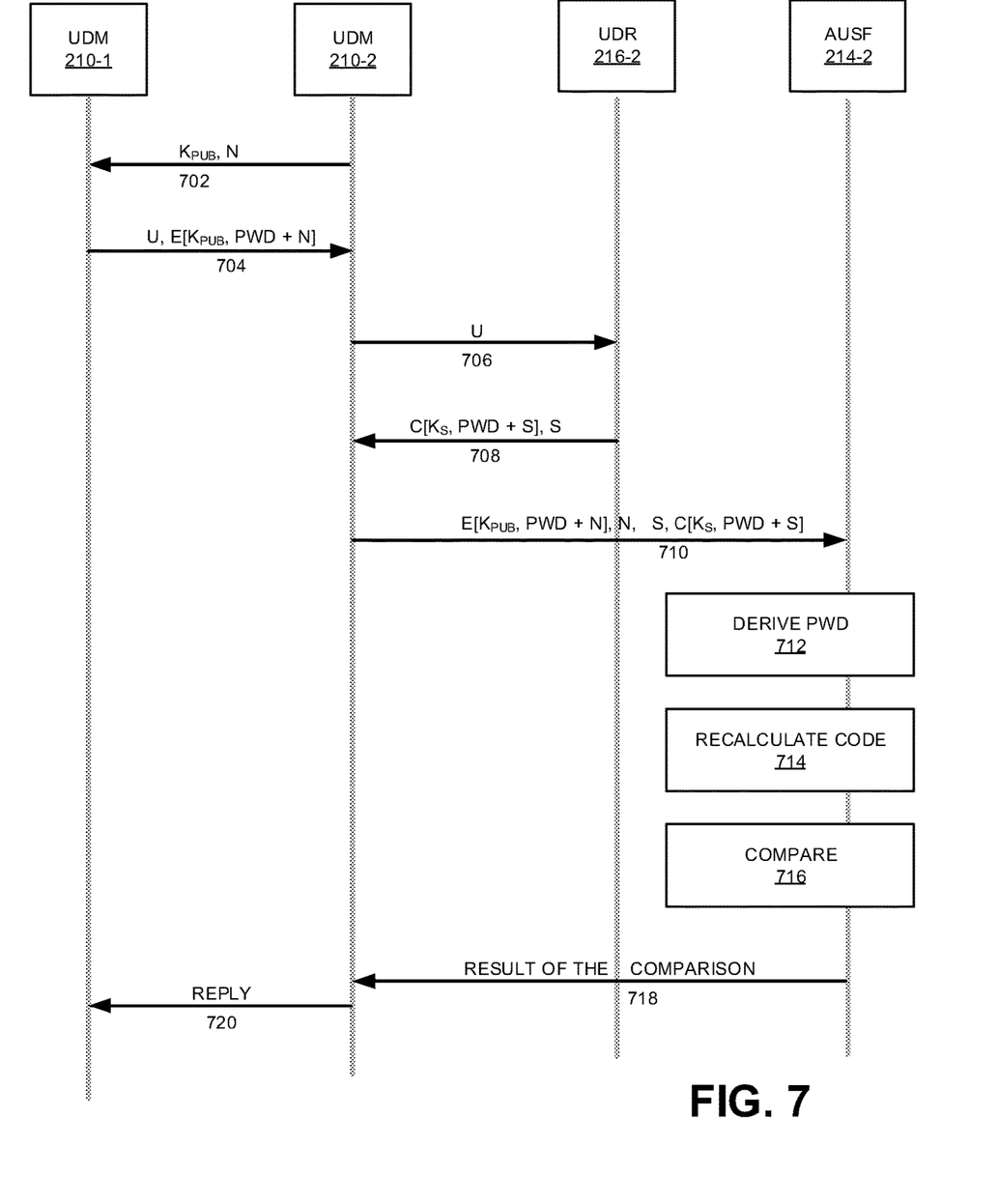
FIG. 7 is a signaling diagram of an example process that is associated with authenticating a Unified Data Management (UDM) of a wireless network at another UDM of another wireless network, according to one implementation.

In FIG. 6, at arrow 610 and at block 612, UDM 210-1 and UDM 210-2 may exchange many messages and/or perform many procedures together with other network components to authenticate UDM 210-1 at UDM 210-2. That is, one UDM authenticates another UDM. FIG. 7 is a signaling diagram of an example process that is associated authenticating UDM 210-1 at UDM 210-2 according to an implementation. In particular, the process illustrated by FIG. 7 is associated with the messages and procedures of arrow 610 and block 612 of FIG. 6. As shown in FIG. 7, the process occurs between UDM 210-1, UDM 210-2, UDR 216-2, and AUSF 214-2. For the process shown in FIG. 7, assume that AUSF 214-2 has a public key $K_{PUB}$ and a private key $K_S$; and that UDM 210-2 is in possession of the public key $K_{PUB}$.

The process of FIG. 7 may begin after UDM 210-1 has sent a request to initiate an authentication (as part of arrow 610 in FIG. 6) to UDM 210-2. As shown, UDM 210-2 may respond to UDM 210-1 by sending its public key $K_{PUB}$ and a nonce N generated at UDM 210-2 to UDM 210-1 (arrow 702). UDM 210-1 then encrypts (e.g., using Rivest-Shamir-Adleman (RSA) encryption algorithm) a string which results from concatenating its password PWD (e.g., part of UDM 210-1's credentials vector) with the nonce N, to obtain an encrypted string E. UDM 210-1 then forwards the encrypted string E and a user identifier (U) of UDM 210-1 to UDM 210-2 (arrow 704).

UDM 210-2 then relays the user ID U of UDM 210-1 to UDR 216-2 (arrow 706), which then retrieves a code C (e.g., a message authentication code (MAC)) that was: (A) generated during the creation of the credentials vector for UDM 210-1 at AUSF 214-2; and (B) stored at UDR 216-2. AUSF 214-2 may have generated the code C by applying private key $K_S$ to the result of concatenating the password PWD with a salt S and may have stored the code C and the salt S at UDR 216-2. At arrow 708, in addition to retrieving the code C, UDR 216-2 may also retrieve the salt S. UDR 216-2 may forward the code C and the salt S to UDM 210-2 (arrow After receiving the code C and the salt S, UDM 210-2 may send the encrypted string E received from UDM 210-1

(the result of encrypting PWD+N), the salt S (retrieved from UDR 216-2), and the code C (retrieved from UDR 216-2) to AUSF 214-2 (arrow 710).

After AUSF 214-2 receives E (the encrypted PWD+N), the nonce N, the salt S, and the code C, AUSF 214-2 decrypts the encrypted PWD+N, using its private key $K_S$. Then, using the nonce, AUSF 214-2 derives the password (block 712) by removing the nonce N from the PWD+N obtained through the decryption. Next, using the password PWD, the salt S, and its private key $K_S$, AUSF 214-2 recalculates the code (block 714) to obtain $C_R$ and compares the recalculated code $C_R$ to the code C it received from UDM 210-2 (block 716). If the recalculated code $C_R$ and the received code C are identical, UDM 210-1 identity is deemed verified and its authentication is successful; otherwise, the authentication fails.

AUSF 214-2 sends the result of the authentication to UDM 210-2 (arrow 718), which then provides a reply to the request for authentication to UDM 210-1. Once authenticated, UDM 210-1 may proceed to request UDM 210-1 to authenticate UE 102 based on its credentials vector, as shown in FIG. 6 and explained above.

Although FIG. 7 illustrates one example process for authenticating UDM 210-1 at UDM 210-2, in other embodiments, other processes may be implemented. For example, in some implementations, a nonce and/or a salt may not be used. In another implementation, UDM 210-1 may authenticate at UDM 210-2 over HTTP/3—without using codes, such as message authentication code (MAC). In still another implementation, UDM 210-2 may treat authentication of UDM 210-1 like authentication of any subscriber of network 200-2 (e.g., authentication request through AMF 212-1).

Figure 8:
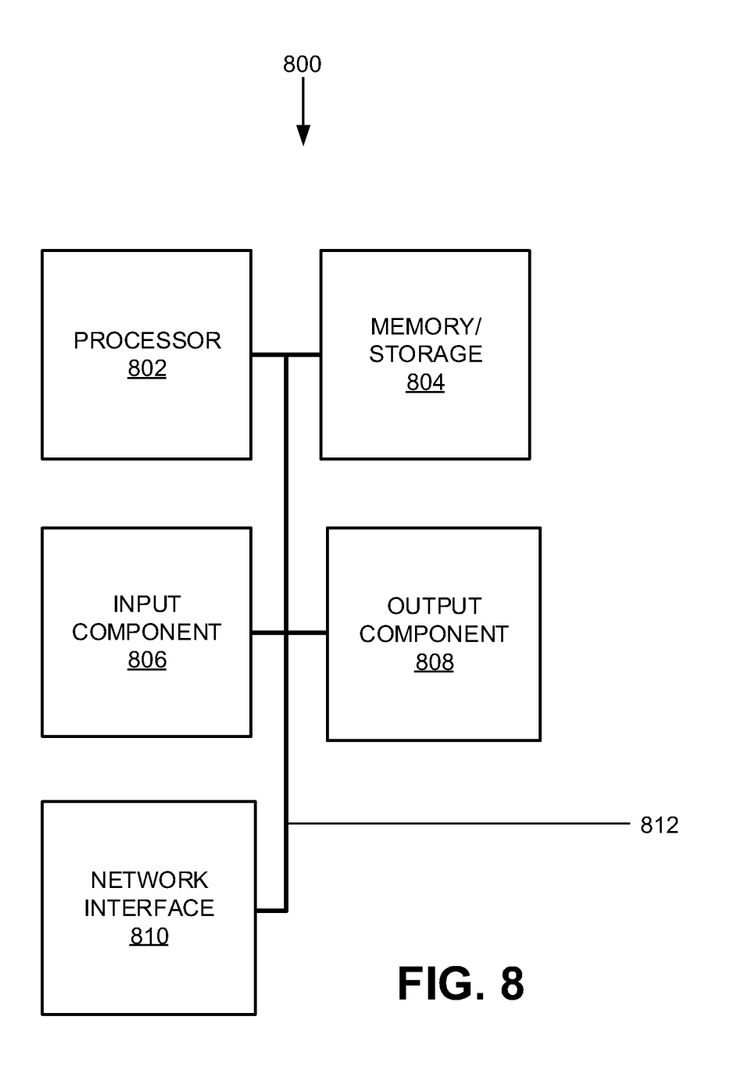
FIG. 8 depicts example components of a network device, according to an implementation.

FIG. 8 depicts example components of an example network device 800. Network device 800 corresponds to or is included in UE 102 and/or any of the network components of FIGS. 1-8 (e.g., a router, a network switch, servers, gateways, AMFs, UDMs, UDRs, AUSFs, etc.). As shown, network device 800 includes a processor 802, memory/storage 804, input component 806, output component 808, network interface 810, and communication path 812. In different implementations, network device 800 may include additional, fewer, different, or a different arrangement of components than the ones illustrated in FIG. 8. For example, network device 800 may include a display, network card, etc.

Processor 802 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.).

Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input and output components 806 and 808 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 800.

Network interface 810 may include a transceiver (e.g., a transmitter and a receiver) for network device 800 to communicate with other devices and/or systems. For example, via network interface 810, network device 800 may communicate with wireless station 208.

Network interface 810 may include an Ethernet interface to a LAN, and/or an interface/connection for connecting network device 800 to other devices (e.g., a Bluetooth interface). For example, network interface 810 may include a wireless modem for modulation and demodulation.

Communication path 812 may enable components of network device 800 to communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory or storage (e.g., memory/storage 804, when executed by processor 802, may cause processor 802 to perform processes that are described herein. For example, UDM 210 (e.g., UDM 210-1 and UDM 210-2), AMF 212 (e.g., AMF 212-1 and AMF 212-2), AUSF 214 (e.g., AUSF 214-1 and AUSF 214-2), and UDR 216 (e.g., UDR 216-1 and UDR 216-2) may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes illustrated in FIGS. 4, 6, and 7 the order of the blocks and arrows may be modified in other implementations. In addition, non-dependent blocks and arrows may represent actions and messages that can be performed or exchanged in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
receiving, at a first network component in a first Fifth Generation (5G) or Long-term Evolution (LTE) wireless network to which a User Equipment device (UE) is not subscribed, a first request, to authenticate the UE, from a core network component in the first 5G or LTE wireless network;
perform an authentication of the UE at the first network component; and
when the performed authentication of the UE is not successful,
sending a second request to authenticate the UE to a second network component in a second 5G or LTE wireless network to which the UE is subscribed;
receiving a response to the second request from the second network component, wherein the response indicates whether the UE is successfully authenticated at the second network component;
determining whether the UE is successfully authenticated at the second network component based on the response; and
sending a first reply to the core network component, wherein the first reply indicates whether the UE is successfully authenticated.

2. The method of claim 1, further comprising:
accessing, by the UE, accessing the first 5G or LTE wireless network after the UE is successfully authenticated, wherein the UE includes a Subscriber Identity Module (SIM); wherein the SIM includes subscriber credentials for the second 5G or LTE wireless network.

3. The method of claim 2, wherein the UE includes no more than one SIM.

4. The method of claim 2, wherein the SIM does not include subscriber credentials for the first 5G or LTE wireless network.

5. The method of claim 2, wherein the second request includes the subscriber credentials for the second 5G or LTE wireless network.

6. The method of claim 1, wherein the first network component comprises one of a Unified Data Management (UDM) or a Home Subscriber Server (HSS); and the second network component comprises one of another UDM or another HSS.

7. The method of claim 1, wherein sending the second request includes:
sending a third request to authenticate the first network component to the second network component.

8. The method of claim 1, further comprising:
when the performed authentication of the UE is successful, sending a second reply to the core network component, wherein the second reply indicates that the UE is successfully authenticated.

9. A device in a first Fifth Generation (5G) or Long-term Evolution (LTE) wireless network, comprising a processor configured to:
receive, at a first network component in the first 5G or LTE wireless network to which a User Equipment device (UE) is not subscribed, a first request, to authenticate the UE, from a core network component in the first 5G or LTE wireless network;
perform an authentication of the UE at the first network component; and
when the performed authentication of the UE is not successful,
send a second request to authenticate the UE to a second network component in a second 5G or LTE wireless network to which the UE is subscribed;
receive a response to the second request from the second network component, wherein the response indicates whether the UE is successfully authenticated at the second network component;
determine whether the UE is successfully authenticated at the second network component based on the response; and
send a first reply to the core network component, wherein the first reply indicates whether the UE is successfully authenticated.

10. The device of claim 9, wherein the UE includes a Subscriber Identity Module (SIM); wherein the SIM includes subscriber credentials for the second 5G or LTE wireless network.

11. The device of claim 10, wherein the UE includes no more than one SIM.

12. The device of claim 11, wherein the SIM does not include subscriber credentials for the first 5G or LTE wireless network.

13. The device of claim 10, wherein the second request includes the subscriber credentials for the second 5G or LTE wireless network.

14. The device of claim 9, wherein the first network component comprises one of Unified Data Management (UDM) or a Home Subscriber Server (HSS); and the second network component comprises one of another UDM or another HSS.

15. The device of claim 9, wherein sending the second request includes:
sending a third request to authenticate the first network component to the second network component.

16. The device of claim 9, wherein the processor is further configured to:
when the performed authentication of the UE is successful, send a second reply to the core network component, wherein the second reply indicates that the UE is successfully authenticated.

17. A non-transitory computer-readable medium comprising processor-executable instructions that, when executed by a processor, cause the processor to:
receive, at a first network component in a first Fifth Generation (5G) or Long-Term Evolution (LTE) wireless network to which a User Equipment device (UE) is not subscribed, a first request, to authenticate the UE, from a core network component in the first 5G or LTE wireless network;
perform an authentication of the UE at the first network component; and
when the performed authentication of the UE is not successful,
send a second request to authenticate the UE to a second network component in a second 5G or LTE wireless network to which the UE is subscribed;
receive a response to the second request from the second network component, wherein the response indicates whether the UE is successfully authenticated at the second network component;
determine whether the UE is successfully authenticated at the second network component based on the response; and
send a first reply to the core network component, wherein the first reply indicates whether the UE is successfully authenticated.

18. The non-transitory computer-readable medium of claim 17, wherein the UE includes a Subscriber Identity Module (SIM); and wherein the SIM includes subscriber credentials for the second 5G or LTE wireless network.

19. The non-transitory computer-readable medium of claim 18, wherein the UE includes no more than one SIM.

20. The non-transitory computer-readable medium of claim 19, wherein the SIM does not include subscriber credentials for the first 5G or LTE wireless network.

* * * * *